United States Patent [19]

Uehara et al.

[11] Patent Number: 4,748,443
[45] Date of Patent: May 31, 1988

[54] METHOD AND APPARATUS FOR GENERATING DATA FOR A SKELETON PATTERN OF A CHARACTER AND/OR A PAINTED PATTERN OF THE CHARACTER

[75] Inventors: Tetsuzou Uehara, Tokyo; Tutomu Itoh; Motohide Kokunishi, both of Hachioji; Toshio Hirosawa, Machida, all of Japan

[73] Assignee: Hitachi, Ltd., Tokyo, Japan

[21] Appl. No.: 766,435

[22] Filed: Aug. 16, 1985

[30] Foreign Application Priority Data

Sep. 7, 1984 [JP] Japan ............................. 59-186319

[51] Int. Cl.⁴ ............................................. G09G 1/16
[52] U.S. Cl. .................................. 340/751; 340/724; 340/731
[58] Field of Search ............... 340/751, 747, 745, 731, 340/724

[56] References Cited

U.S. PATENT DOCUMENTS 3,364,382  1/1968  Harrison, III ............... 340/725
4,195,338  3/1980  Freeman ...................... 340/724
4,600,919  7/1986  Stern ........................... 340/747

*Primary Examiner*—Marshall M. Curtis
*Attorney, Agent, or Firm*—Antonelli, Terry & Wands

[57] ABSTRACT

Method and apparatus for generating data for a skeleton pattern of a character and/or a painted character pattern are provided. A dot matrix pattern representative of a character pattern is stored in a memory and it is displayed on a display device, positions of a plurality of skeleton points for defining a skeleton line position of each of line segments on the displayed dot matrix pattern are specified on the display screen. Kinds of basic elements for the respective line segments are entered by an operator. Lines connecting the skeleton points of the respective line segments are superimposed on the dot matrix pattern as skeleton lines and they are displayed in a distinguishable form. A character outline pattern corresponding to the skeleton lines or a painted pattern thereof is generated based on the input skeleton point positions and the kinds of line segments. The character outline pattern or the painted pattern thereof is displayed on the display device in a distinguishable form as the superposition of the character dot matrix pattern and the character skeleton line pattern. The positions of the skeleton points to be corrected and positions of new skeleton points to be replaced therewith are indicated on the display screen and the character outline pattern or painted pattern thereof is repeatedly displayed based on the corrected skeleton point positions until a desired character outline pattern or painted pattern thereof is generated. The corrected skeleton point positions and the kinds of corresponding basic elements and/or painted character pattern data generated based upon the corrected skeleton point position are stored in the memory.

9 Claims, 11 Drawing Sheets

| KIND OF BASIC ELEMENTS | SHAPE PARAMETERS | | | | | | | |
|---|---|---|---|---|---|---|---|---|
| '02' (LATERAL LINE) | a | c | d | e | f | g | θ | w |

METHOD AND APPARATUS FOR GENERATING DATA FOR A SKELETON PATTERN OF A CHARACTER AND/OR A PAINTED PATTERN OF THE CHARACTER

BACKGROUND OF THE INVENTION

The present invention relates to a method and apparatus for generating a skeleton pattern data representative of a skeleton of a character which is used to generate a painted character pattern used for printing or displaying a character and/or for generating painted character pattern data.

In a prior art apparatus, when a character such as a Kanji character is to be displayed or painted, a dot matrix pattern representative of the character is previously stored in a memory and it is displayed on an output device directly or in an enlarged or reduced scale.

When the enlarged character pattern is generated in this method, an outline of the character is not smooth. Accordingly, this method is not suitable for generation of a high quality of character pattern. Thus, where a dot matrix pattern is used, patterns of different sizes have to be prepared for each character. This requires a very large memory capacity.

As an approach to resolve the problem encountered in the dot matrix pattern method, a method for graphically generating a character pattern has been proposed. In this method for example, a graphic data representative of an outline of a character pattern is stored in a memory, and when a character pattern is to be generated based on the stored data, the data is processed for enlargement, or reduction and rotation by a known computer graphic technique so that the character is outputted in any size and any angle without degrading a quality of the pattern. It is important how simply the graphic data is generated. One example thereof is disclosed in "A Chinese META-FONT" by J. D. Hobby and G. U. Guoan, Proceeding of ICTP, 1983, pp. 62-63. In this method, a human describes a Kanji character pattern by a kind of computer language to use it as a pattern data. A character pattern is generated based on the pattern data in accordance with a predetermined conversion algorithm, and if the generated character pattern is determined to be inappropriate in shape, the description of the language is corrected. This method requires time for describing the language, checking the generated pattern and correcting the description.

In a method proposed by Kikuchi et al, Proceedings of 29th General Meeting of Information Processing Society of Japan, pp. 1435-1436 (Sept. 11-13, 1984), a character skeleton pattern comprising skeleton (enter) lines of elements of a character pattern is stored in a memory as a pattern data, and it is processed to generate a line pattern (character outline pattern) representative of an outline of the character pattern, and an inner area of the character outline pattern is painted to produce a desired character pattern.

Figure 1:
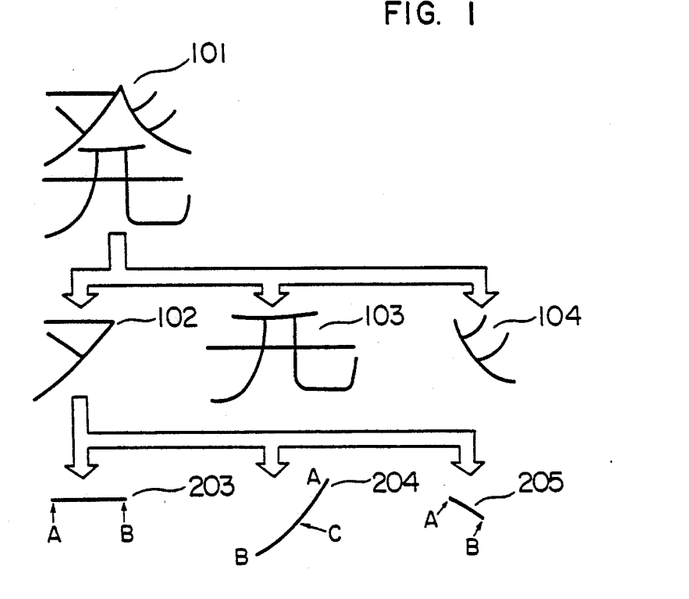
FIG. 1 illustrates a construction of a Kanji character.

Referring to FIG. 1, a construction of a Kanji character is explained. A character 101 is divided into three partial patterns 102-104. The first partial pattern 102 consists of three basic elements 203, 204 and 205. Those elements are called lateral line, left-downward line and dot, respectively. Each Kanji character consists of a plurality of basic elements. A Kanji pattern can be generated by the basic elements which compose the Kanji character and positions thereof. The position of the basic element can be specified by positions of a plurality of points on the basic element (called skeleton points). In the elements 203 and 205, a start point A and an end point B are used as the skelton points, and in the element 204, a midpoint C is additionally used. The basic element is approximated by a line or a segmental curve which connects the skeleton points. The Kanji character usually consists of a plurality of basic elements and the same basic element may be included in different Kanji characters. Accordingly, the number of kinds of basic elements required to display a number of Kanji characters is much smaller than a total number of Kanji characters.

Figure 2A:
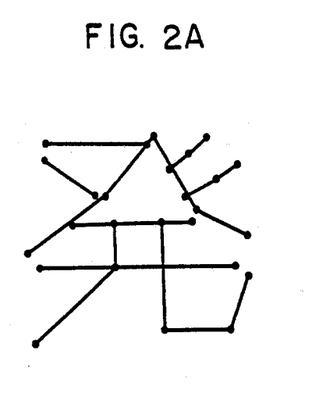
FIG. 2A shows a character skeleton pattern.
Figure 2B:
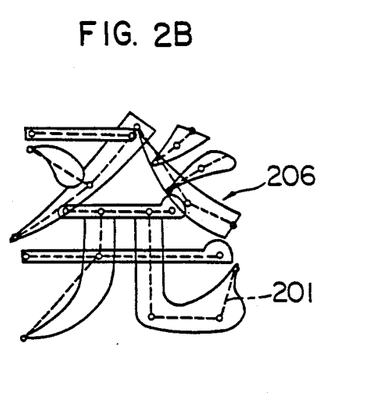
FIG. 2B shows a character outline pattern and a character skelton pattern superimposed to each other.

FIG. 2A shows all basic elements and points thereof of the Kanji character shown in FIG. 1. Black dots show the skeleton points. The character pattern 201 consisting of those basic elements is hereinafter called a character skeleton pattern, because the basic elements of the character pattern of FIG. 2A may be considered to represent the skeleton lines (center lines) of the character pattern to be displayed. Data of the basic elements (kinds of elements and skeleton points) which belong to the pattern are called basic element data. In the article by Kikuchi et al, a character outline pattern consisting of outlines of the elements of the character to be displayed and a painted pattern thereof are generated based on the basic element data. In FIG. 2B, the character outline pattern 206 (solid line) is shown in superposition to the character skeleton pattern 201 (broken line).

In this method, only the skeleton pattern data is required as the pattern data and the preparation of the pattern data is easier in this method than in the first method. However, in this method, if the skeleton pattern is not appropriate, the shape of the painted character pattern generated based on the character skeleton pattern is not a desired one and the character skeleton pattern data must be corrected. Accordingly, it is important how simply the character skeleton pattern is prepared and how it is corrected.

SUMMARY OF THE INVENTION

It is an object of the present invention to provide a simple method and apparatus for generating a character skeleton pattern data to be used in generating a high-quality painted character pattern and/or for generating painted character data.

Figure 11:
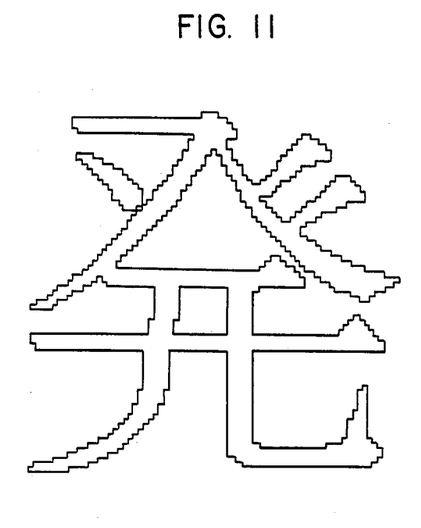
FIG. 11 shows a Kanji dot matrix pattern displayed in the apparatus of FIG. 3.
Figure 12:
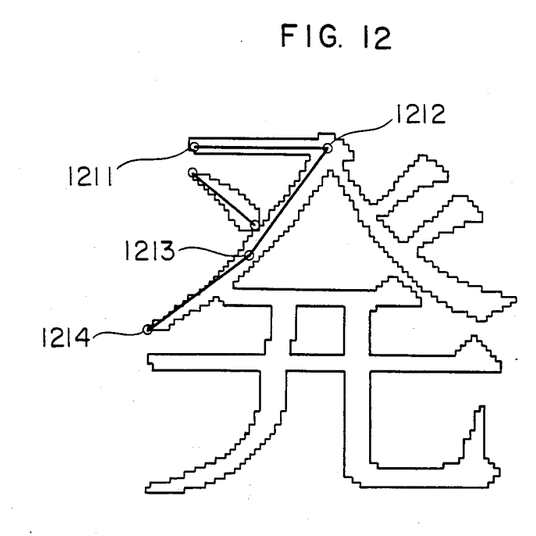
FIG. 12 shows a display screen in the apparatus of FIG. 3 after skeleton points of some of basic elements have been entered.
Figure 13:
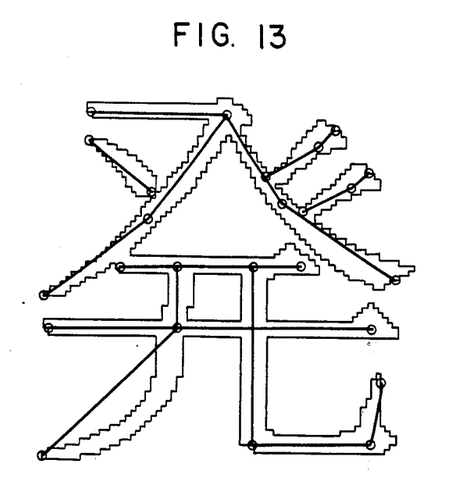
FIG. 13 shows a display screen in the apparatus of FIG. 3 after skeleton points of all basic elements have been entered.
Figure 14:
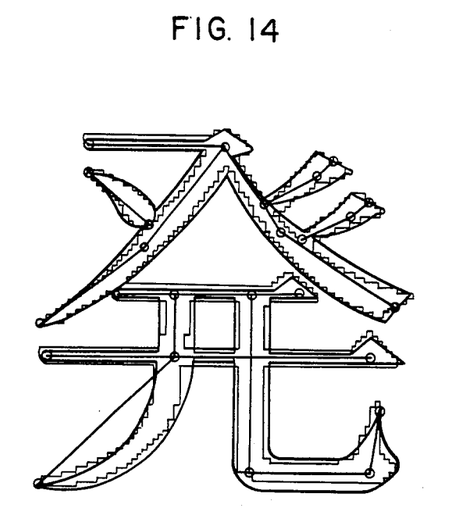
FIG. 14 shows a display screen in the apparatus of FIG. 3 when an outline pattern is displayed in superposition to a dot matrix pattern and a skeleton pattern.

In order to achieve the above object, in accordance with the present invention, a dot matrix pattern (FIG. 11) representative of a character pattern is stored in a memory and it is displayed on a display device. Positions of a plurality of skeleton points for defining a skeleton line position of each of line segments on the displayed dot matrix pattern are specified on the display screen. Kinds of basic elements for the respective line segments are entered by an operator (FIG. 12). Lines connecting the skeleton points of the respective line segments are superimposed on the dot matrix pattern as skeleton lines, and they are displayed in a state distinguishable from the dot matrix pattern, for example, with colors different from the dot matrix pattern (FIG. 13). A character outline pattern corresponding to the skeleton lines or a painted pattern thereof is generated based on the input skeleton point positions and the kinds of line segments. The character outline pattern or the painted pattern thereof is displayed on the display device in superposition to the character dot matrix pattern and the character skeleton line pattern and in a distinguishable form (FIG. 14). The positions of the skeleton points to be corrected and positions of new skeleton points to be replaced therewith are indicated on the display screen and the character outline pattern or painted pattern thereof is repeatedly displayed based on the corrected skeleton point positions until a desired character outline pattern or painted pattern thereof is generated. The corrected skeleton point positions and the kinds of corresponding basic elements and/or painted character pattern data generated based upon the corrected skeleton pattern data are stored in the memory.

DESCRIPTION OF THE PREFERRED EMBODIMENTS

Figure 3:
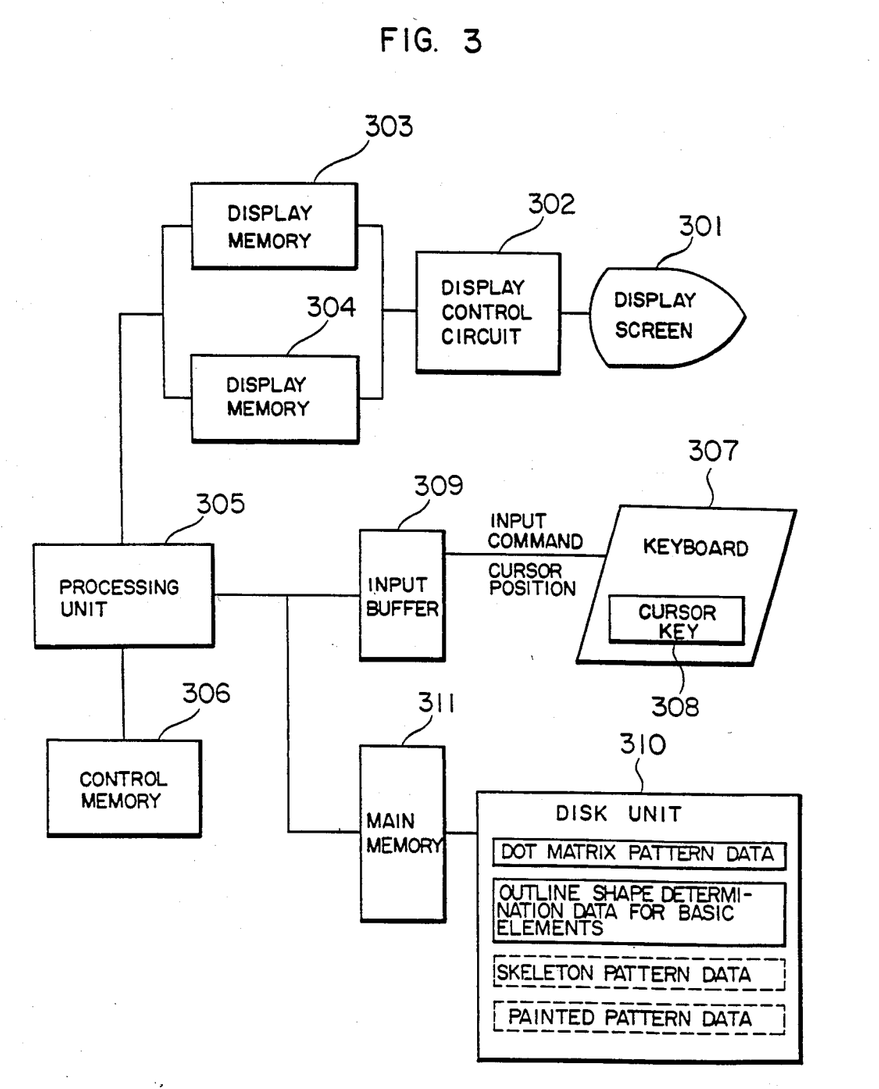
FIG. 3 is a block diagram of an interactive character pattern data generating apparatus of the present invention.

FIG. 3 is a block diagram of a data generating apparatus of the present invention. Numeral 301 denotes a display screen of a display device, numeral 302 denotes a display control circuit, numeral 303 denotes a first display memory which stores information to be displayed on the display screen 301, numerals 304 denotes a second display memory, numeral 305 denotes a processing unit for controlling the operation of the present apparatus, numeral 306 denotes a control memory which stores a microprogram to be used by the processing unit 305, numerals 307 denotes a keyboard, numeral 308 denotes a cursor shift key for designating a point on the display screen 301, numeral 309 denotes an input buffer for retaining input information, numeral 310 denotes a disk unit, and numeral 311 denotes a main memory of the processing unit 305. The main memory 311 stores program and data for controlling the present apparatus. The disk unit 310 stores pregenerated dot matrix pattern data and stores skeleton pattern data generated based on the stored dot matrix pattern data, and predetermined outline shape determination data. The keyboard 307 is used by an operator to input a command or codes of characters whose patterns are to be generated. The cursor 308 is used by the operator to specify a point on the display screen 301. The input buffer 309 stores input information from the keyboard 307 and the cursor 308. The display memories 303 and 304 store dot patterns of characters to be displayed on the display screen through the display control circuit. The display memory 303 is used to store dot patterns representative of dot matrix patterns of the characters to be displayed and dot patterns representative of outline patterns, and the display memory 304 is used to store dot patterns representative of skeleton patterns of the characters to be displayed. In displaying those patterns on the display screen 301, the display control circuit 302 preferentially displays the data in the display memory 304 on coordinates on the display screen. Thus, if output dot information for one coordinate is stored in both the display memory 303 and the display memory 304, the information in the display memory 304 is outputted. If the output dot information for the coordinate is stored in only one of the display memories 303 and 304, the display control circuit 302 outputs that information. The display memories 303 and 304 each has plural-bit information for each coordinate on the display screen 301 so that color display is attained.

Figure 4:
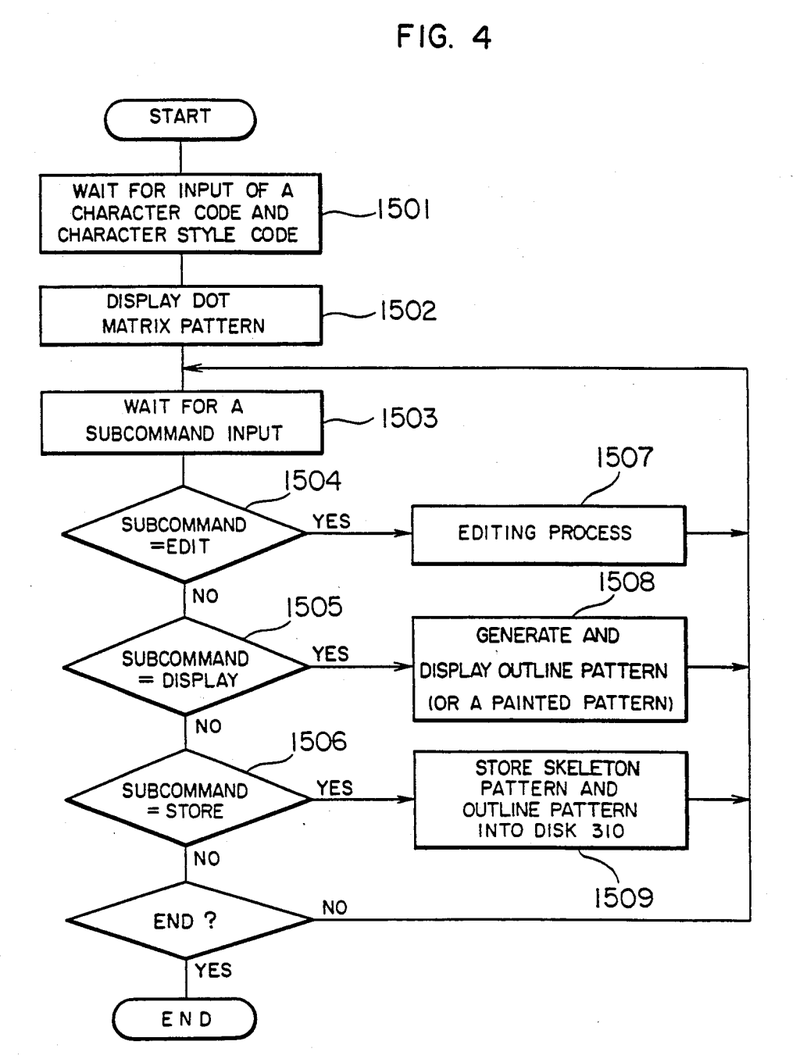
FIG. 4 is a flow chart of an operation of the apparatus of FIG. 3.

FIG. 4 shows a flow chart of a program to be executed by the processing unit 305 of FIG. 3. First, input of, for example, a Kanji code and a character style code by the operator is monitored (1501). A dot matrix pattern of the input Kanji code is read from the disk unit 310 and displayed on the display screen 301. FIG. 11 shows an example of the pattern (1502).

Figure 6:
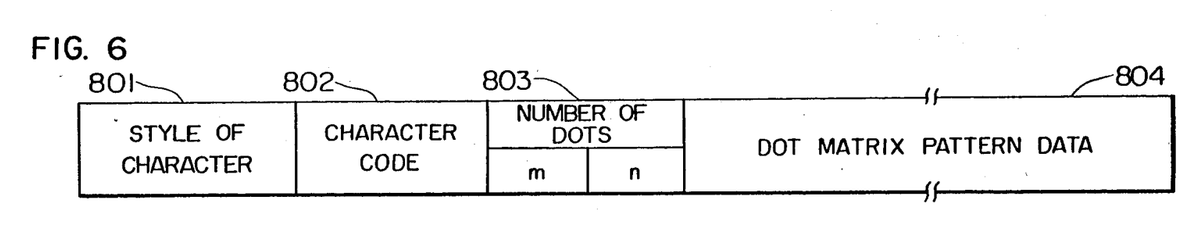
FIG. 6 shows a format of a dot matrix pattern data.

FIG. 6 shows a format of an entry for one Kanji character in a dot matrix pattern table. Numeral 801 denotes information representing a style of a character pattern, numeral 802 denotes a character code of the entry, numeral 803 denotes numbers of dots of the dot matrix pattern (m represents the number of dots in a vertical line and n represents the number of dots in a horizontal line), and numeral 804 denotes dot data representing the dot matrix pattern.

Turning back to FIG. 4, the processing unit 305 monitors input of a subcommand by the operator (1503) and checks if the subcommand is "display", "store" or "edit" subcommand (1504–1506). If it is the edit subcommand, it edits the data (1507). The edit process 1507 is shown in detail in FIG. 5.

In the edit process, specification of the edited operation is monitored (1601), and new character generation process or correction process is carried out.

The new character generation process is first explained. The processing unit 305 secures an area on the main memory 311 in which a skeleton pattern data of the character to be generated is to be stored, and an area in which a character outline pattern data used to generate the character is to be stored. It transfers an outline shape determination data from the disk unit 310 to the main memory (1619). Those data will be described later.

The operator watches the dot matrix pattern (FIG. 11) displayed on the display screen 301 and inputs a kind of one of basic elements of the dot matrix pattern by the keyboad 307 and inputs skeleton points on the basic element (for example, points 1211 and 1212 in FIG. 12)

by the cursor key 308. Then, the operator repeats the above operation on other basic elements. Points 1212-1214 show skeleton points on the other basic elements. The processing unit 305 processes the kinds of the input basic elements and the coordinates thereof (1620, 1621). That is, it updates the data in the skeleton pattern data area on the main memory 311. Then, skeleton lines connecting the input skeleton points are displayed on the display screen 301 (1623). In this manner, the input process for the basic element is carried out. If an end command is inputted in 1624, the edit process is terminated depending on the decision in 1625. If the end command is not inputted, the input process is repeated from 1620. FIG. 12 shows the displayed skeleton lines.

The skeleton pattern data is updated in the following manner.

Figure 7:
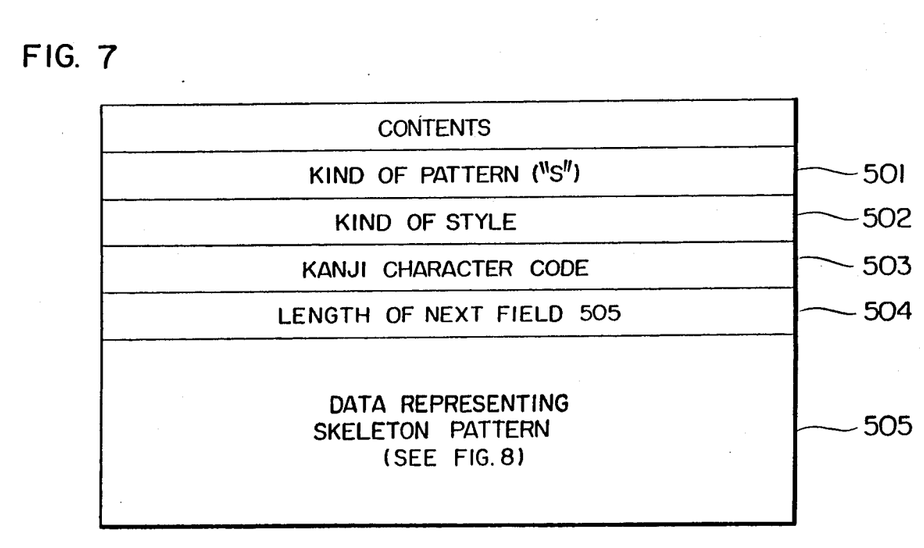
FIG. 7 shows a format of a skeleton pattern data.
Figure 8:
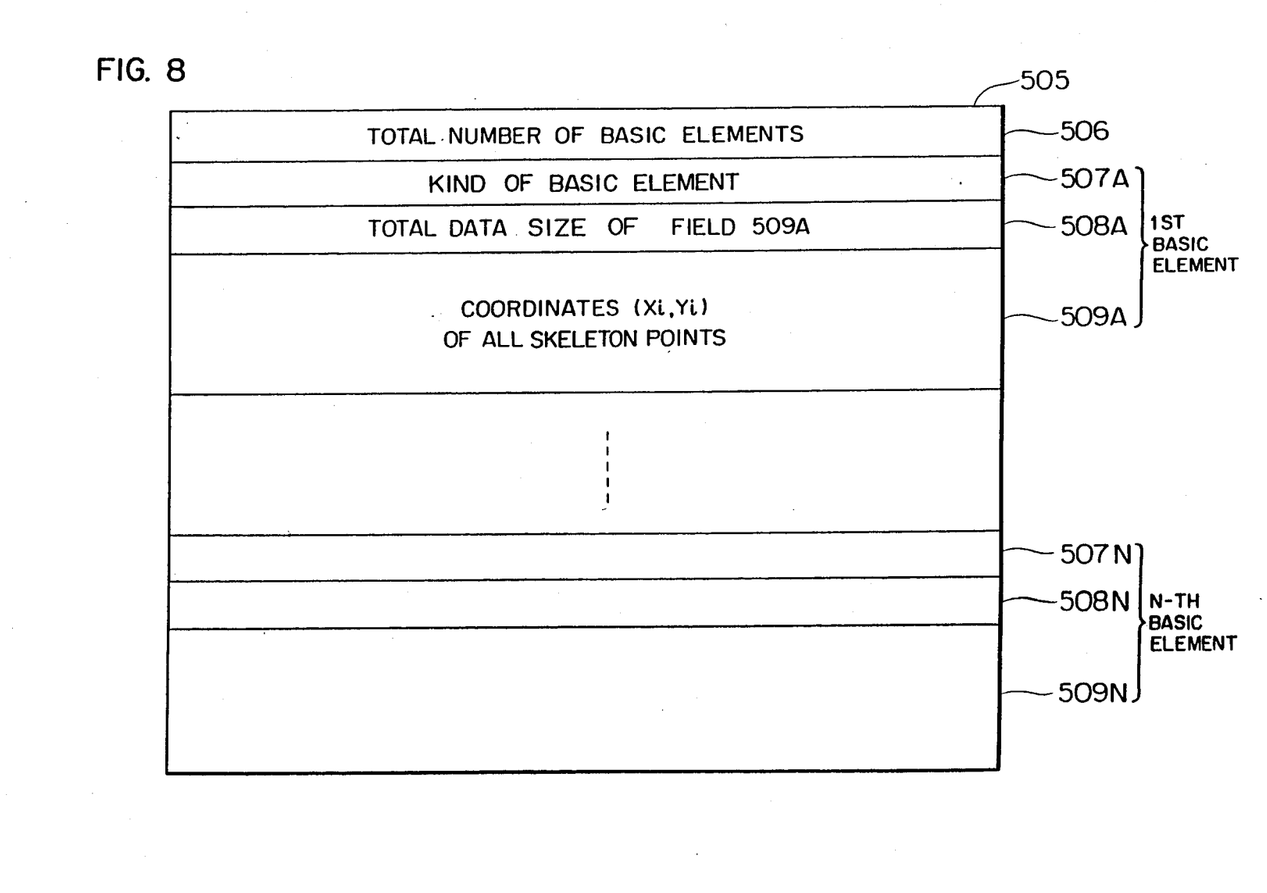
FIG. 8 shows a detailed format in a fifth field of FIG. 7.

FIG. 7 shows a format of the character skeleton pattern data. The data has five fields 501-505. The first field 501 represents a kind of character pattern. For the skeleton pattern, "S" is set. The second field 502 contains a style identification code which indicates whether the character is Gothic or not. The third field 503 contains a Kanji code, the fourth field 504 contains a length of the fifth field 505. A format of the fifth field 505 is shown in FIG. 8. The fifth field 505 has a field 506 which contains the number N of basic elements of the character and data field 507A-509A, ..., 507N-509N for the N basic elements. Each of the basic element data fields includes a kind of basic element field 507, a data size field 508 for a next field 509, and a field 509 of coordinates (X, Y) of all skeleton points belonging to the basic element.

The processing unit 305 sets "S" into the field 501 of the skeleton pattern data (FIG. 5) in the initialization process 1619, and sets the style kind and the Kanji code inputted by the operator into the fields 502 and 503. When the kind of element is inputted by the operator, the processing unit 305 sets it into the field 507A (FIG. 8) and increments the number of element field 506. When the skeleton points are specified by the operator, the processing unit 305 sets the coordinates (X, Y) thereof into the field 509A and updates the field 508A. The above operation is repeated for all other basic elements.

The processing unit 305 generates a pattern which interpolates the skeleton points by line segments for each basic element of the skeleton pattern data and writes it together with the pattern representing the coordinates of the skeleton points into the display memory 304.

FIG. 13 shows a display pattern at the end of the edit process. The dot pattern and the skeleton pattern are displayed in an overlapped fashion in a distinguishable form, for example, in different colors.

Turning back to FIG. 4, after the edit process, the processing unit 305 waits for a subcommand (1503). When the input of all basic elements of one character is completed, the operator inputs a display command. As the processing unit detects it (1505), it generates and displays the outline pattern (1508). The pattern is generated based on the generated skeleton pattern data on the main memory 311 and the outline shape determination data transferred from the disk unit 310. This method is identical to the method disclosed in the article by Kikuchi et al and it is incorporated herein by reference. This method is briefly explained below.

Figure 9:
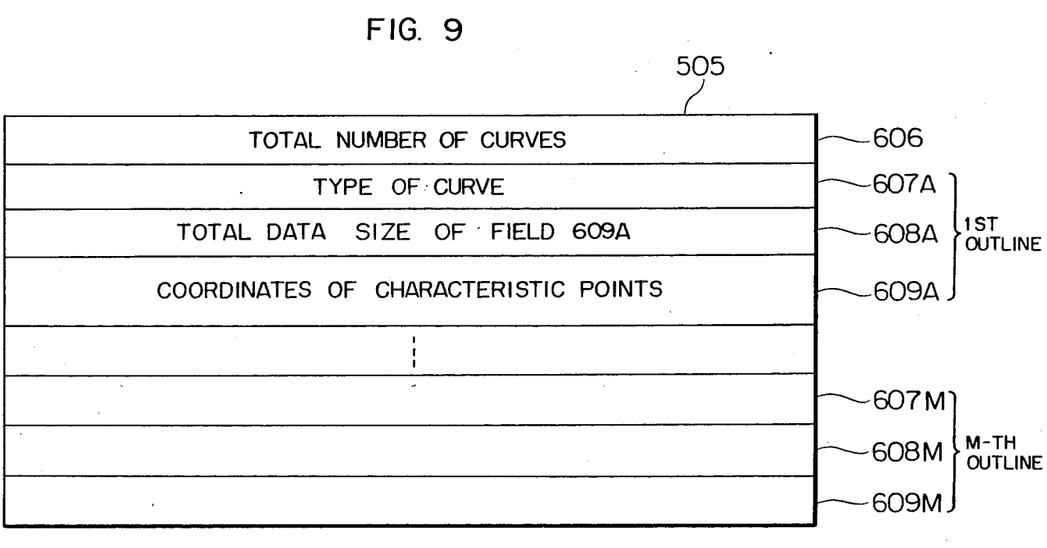
FIG. 9 shows a format of a different portion of the character outline pattern data than that of FIG. 7.
Figure 10A:
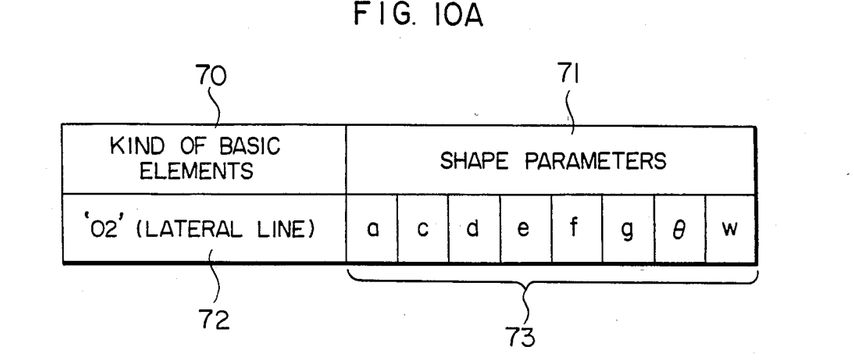
FIG. 10A shows a format of an outline shape determination data of one basic element.
Figure 10B:
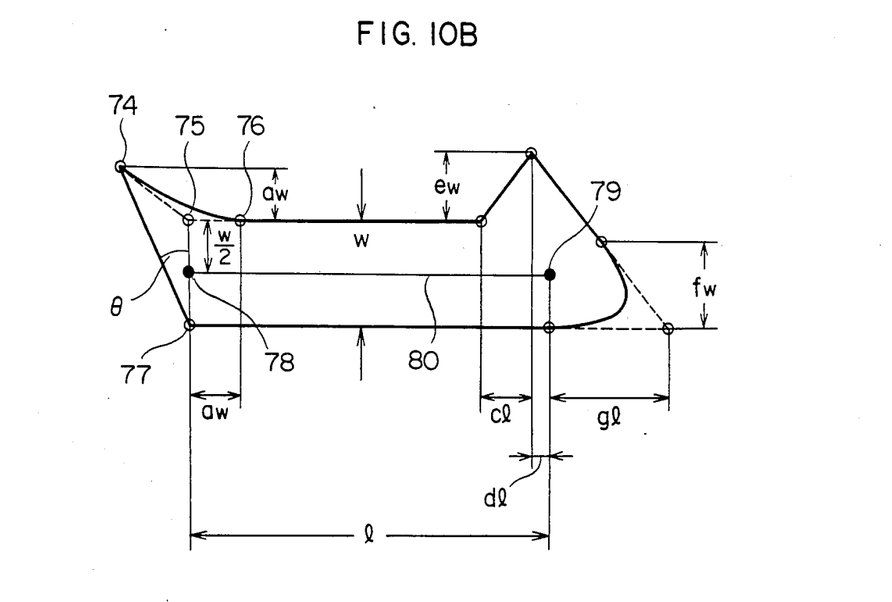
FIG. 10B shows a relation among a shape determination parameter, skeleton point positions and corresponding outline pattern, for one basic element.

The outline shape determination data presents parameters necessary to generate an outline curve from the basic elements, for each kind of the basic element. As shown in FIG. 10A, a format of data on one basic element comprises a kind of basic element field 70 and a field 71 which contains shape parameters for determining characteristic points which define the outline shape. The shape parameters 71 is a numeral array which reflects the shape characteristic of the basic element, and the meaning and the number thereof are determined by the kind of the basic element. A field 72 in FIG. 10A contains "02" which indicates a kind "lateral line" of the basic element, and a field 73 shows the shape parameters. FIG. 10B illustrates the meaning of "lateral line", that is, the shape parameters of the basic element. Symbol "." indicates the skeleton point of the skeleton pattern and symbol "O" indicates the characteristic point of the outline curve. The shape parameter W indicates a width of a lateral line, the parameter a indicates that a vertical rise at the left end is aW and the parameter $\theta$ indicates an inclination of the left inclined line. By those parameters, the characteristic points 74, 75, 76 and 77 on the outline curve are determined. If we draw a line which passes through the skeleton point 78 and is normal to a line 80 connecting the skeleton points 78 and 79, the point 75 is W/2 above the point 78, and the point 77 is W/2 below the point 78. The point 74 is at a crosspoint of a line which passes through the point 77 and makes an angle of $\theta$ with a line connecting the points 75 and 77 and a line which is parallel to the line 80 and is aW+W/2 above the line 80. The point 76 is on a line which passes through the point 75 and is parallel to the line 80 and is aW righward of the point 75. Other outline characteristic points in FIG. 10B can be determined by the shape parameters. In order to interpolate the characteristic points in generating the outline, straight line, circle, arc, spline or Bezier curve may be used. The kind of the characteristic points and the kind of the interpolation curves are determined by the kind of the basic elements. For example, when the basic element in the lateral line, the characteristic points 74 and 77 of FIG. 10B are connected by a straight line, and the characteristic points 74, 75 and 76 are interpolated by a Bezier line. In this manner, the outline pattern can be determined by the outline determination data and the skeleton pattern data. the processing unit 305 stores the outline pattern data thus obtained into an area of the main memory 311 in the following manner. The format of the character outline pattern data is different from the format of the skeleton pattern data shown in FIG. 7 in the following points. The first field 501 contains "P". The fifth field 505 has a format shown in FIG. 9. The fifth field 505 includes a field 606 which indicates a total number L of character outline curves, a field 607 which indicates the kind of curve such as straight line, spline or circle, a field 608 which indicates a size of data in a next field 609 which indicates coordinates of the characteristic points defining the outline curve. The processing unit 305 generates a series of points on a curve which interpolates the characteristic points on the outline curve in accordance with the interpolation curve, and writes the series of points into the display memory 303. In this manner, the outline pattern is displayed. The outline pattern is displayed in a different color than those of the dot matrix pattern and the skeleton pattern so that they are distinguished from each other.

FIG. 14 shows the three patterns displayed in superposition. Circles indicate the input skeleton points and the skeleton pattern is formed by connecting the skeleton points by straight lines. A zigzag pattern is the dot matrix pattern. The outline pattern is formed by surrounding the skeleton pattern by curves or straight lines.

Turning back to FIG. 4, after the display process, the processing unit 305 again waits for a subcommand input (1503).

The operator checks if there is a deviation between the dot matrix pattern and the outline pattern, and if correction of the outline pattern is desired, the operator again issues an edit command. Turning back to FIG. 4, when the edit command is detected (1504), the processing unit 305 again waits for an edit input of FIG. 5 (1601). In the correction process, the operator designates the basic elements to be corrected, and only the basic elements which are to be corrected are displayed in a different color (1604). The processing unit 305 then waits for a correction input (1605) and changes the coordinates, deletes the coordinates or determines the change of kind (1606, 1610, 1614).

Figure 5:
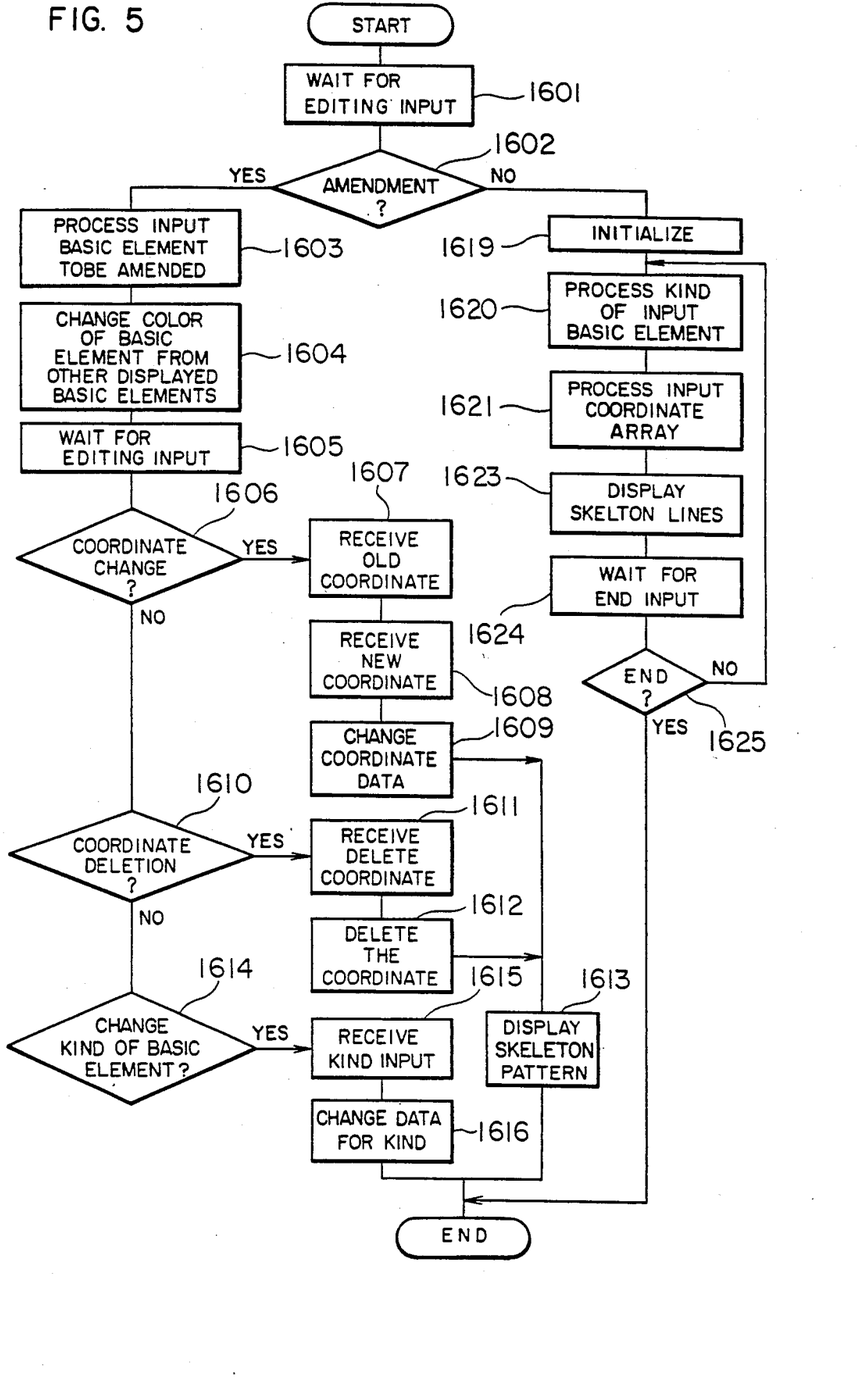
FIG. 5 is a flow chart of an operation of an edit process of FIG. 4.

In the coordinate change process, the coordinates before and after the change are read (1607, 1608), the coordinates in the skeleton area of the main memory 311 are changed (1609), and the corrected skeleton pattern is displayed on the display screen 301 (1613).

In the coordinate deletion process, the coordinates to be deleted are read (1611), and the coordinates in the skeleton area are deleted (1612). Then, the skeleton pattern is displayed (1613).

In the kind change process, the kind of the basic element after the correction is read (1615) and the data in the skeleton area is updated.

After the edit process for the correction, the processing unit 305 again waits for a subcommand input in FIG. 4 (1503). The operator again inputs the display subcommand to confirm the corrected outline pattern. The processing unit 305 responds thereto to display the corrected outline pattern in accordance with the corrected skeleton pattern data (step 1508).

The operator repeats the above steps until the desired outline pattern is obtained and compares the dot matrix pattern with the outline pattern and corrects the input skeleton point coordinates.

When the desired outline pattern is obtained, the operator inputs the store subcommand. The processing unit 305 responds thereto (1506) to store the skeleton pattern formed in the main memory 311 into the disk unit 310. The outline pattern data may also be stored into the disk unit 310 so that the skeleton pattern data is recorrected or the painted character pattern is generated.

In this manner, the skeleton pattern data is formed.

Figure 15:
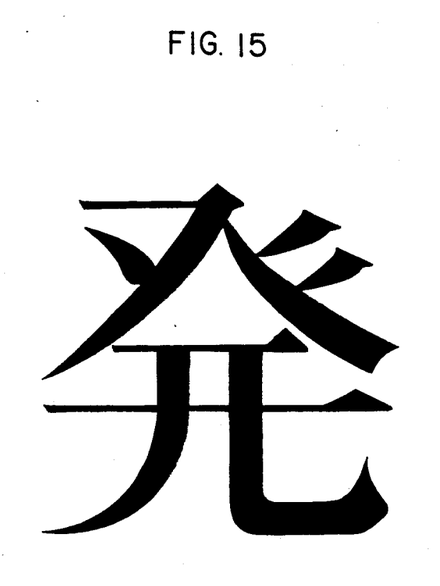
FIG. 15 shows a painted pattern generated in the apparatus of FIG. 3.

In the above embodiments, the outline pattern is generated based on the skeleton pattern data and displayed. Alternatively, a painted pattern may be generated based on the outline pattern and it may be written into the display memory 303 instead of the outline pattern, and it may be displayed in superposition to the dot matrix pattern. After the process of the above embodiments, the painted pattern may be stored into the disk unit 310. FIG. 15 shows a painted pattern generated from the outline pattern.

As described hereinabove, according to the present invention, the skeleton pattern data of the character can be easily generated by merely preparing one dot matrix pattern for each character. By enlarging the skeleton pattern data, a painted character pattern of any size can be generated with high quality. The present invention is also applicable to the generation of character patterns other than Kanji character.

We claim:

1. A method for generating data representative of a character skeleton pattern which is to be used to generate a painted character pattern and data representative of the painted character pattern, said character skeleton pattern data representing positions of skeleton points defining line segments each belonging to one of a plurality of basic elements, wherein those basic elements that are representative of the kinds of basic element for forming the character pattern have at least one corresponding line segment characterized by a substantially straight line connecting skeleton points, said method including the steps of:
    (a) displaying a predetermined dot matrix pattern of a character on a display screen;
    (b) receiving a data signal indicative of a kind of basic element, indicated by an operator, assigned for each line segment of the displayed pattern;
    (c) detecting positions of points, indicated by the operator, on the display screen as points which are to be used as skeleton points of each basic line element;
    (d) displaying a character skeleton pattern on the displayed screen based upon the detected points and overlapping the corresponding displayed dot matrix pattern;
    (e) generating a character outline pattern based upon the assigned kinds of the basic elements and the positions of the indicated skeleton points so that respective portions of the outline pattern corresponding to respective basic elements are formed; and
    (f) displaying one of said generated character outline pattern and a character painted pattern which is a painted pattern of the generated character pattern on the display screen in superposition with the dot matrix pattern and the skeleton pattern.

2. A method according to claim 1, wherein, in said step (f), said dot matrix pattern, said skeleton pattern and either of said outline pattern and said painted pattern are displayed in different display states so as to be separately discernable from each other.

3. A method according to claim 2, wherein said dot matrix pattern, said skeleton pattern and either of said outline pattern and said painted pattern are displayed with different colors.

4. A method according to claim 1, wherein said outline pattern comprises plural partial outline patterns displayed respectively in superposition to the character dot matrix pattern and the skeleton line pattern, and each being generated by the positions of skeleton points of a basic element and the kind of the basic element.

5. Apparatus for generating data representative of a character skeleton pattern to be used for generation of a painted character pattern and data representative of the painted character pattern, said character skeleton pattern data representing positions of skeleton points defining line segments each belonging to one of a plurality of basic elements that are representative of the kinds of basic elements for forming the character pattern, and each such basic element having at least one corresponding line segment characterized by a substantially straight line connecting skeleton points, comprising:
    (a) first display means for displaying a predetermined dot matrix pattern of a character on a display screen thereof;

(b) receiving means for receiving a data signal indicative of a kind of basic element, indicated by an operator, assigned for each line segment of the displayed pattern;

(c) first detection means for detecting positions of points, indicated by the operator, on the display screen as points which are to be used as skeleton points of each basic line element;

(d) second display means for displaying a character skeleton pattern on the displayed screen based upon the points detected by said first detection means and overlapping the corresponding displayed dot matrix patterns.

(e) pattern generating means coupled with said receiving means and said detection means for generating a character outline pattern based upon the assigned kinds of the basic elements and the positions of the indicated skeleton points, so that respective portions of the outline pattern corresponding to respective basic elements are formed; and (f) third display means coupled with said generating means for displaying one of said generated character outline pattern and a character painted pattern which is a painted pattern of the generated character pattern on the display screen in superposition with the dot matrix pattern and the skeleton pattern.

6. A method according to claim 1, further comprising the steps of:

(g) detecting a position or positions of a point or points indicated by the operator as a point or points which should not be used as the skeleton points;

(h) repeating the steps (c) to (f) if requested by the operator;

(i) repeating the steps (g) and (h) if requested by the operator; and (j) storing the positions of the skeleton points belonging to each basic element and the kind of each basic element and/or the generated painted character pattern after the last one of the steps (g), (h) and (i) performed, as data representative of the skeleton pattern.

7. A method according to claim 6, wherein the formation, in step (e), of the respective portions of the outline pattern corresponding to the respective basic elements are formed by determining respective groups of characteristic points for respective basic elements based upon the positions of respective groups of skeleton points belonging to the respective basic elements and respective predetermined positional relationships between the respective groups of the characteristic points and the respective group of the skeleton points which relationships are dependent upon the respective kinds of the respective basic elements.

8. An apparatus according to claim 5, further comprising:

(g) second detection means for detecting a position or positions of a point or points indicated by the operator as a point or points which should not be used as the skeleton points;

(h) first activation means for activating said first detection means, said second and third display means and said pattern generating means in repetition in accordance with a request by the operator;

(i) second activation means for activating said second detection means and said first activation means in repetition in accordance with a request by the operator; and (j) means for storing the positions of the skeleton points belonging to each basic element and the kind of each basic element thus generated, as data representative of the skeleton pattern and/or the generated character pattern.

9. An apparatus according to claim 8, wherein said pattern generating means includes means for generating the respective portions of the outline pattern corresponding to the respective basic elements by determining respective groups of characteristic points for respective basic elements based upon positions of respective groups of skeleton points belonging to the respective basic elements and respective predetermined positional relationships between the respective groups of the characteristic points and the respective group of the skeleton points which relationships are dependent upon the respective kinds of the respective basic elements.

* * * * *